United States Patent [19]

Schnitzke et al.

[11] Patent Number: 5,288,339
[45] Date of Patent: Feb. 22, 1994

[54] PROCESS FOR THE PRODUCTION OF MAGNETIC MATERIAL BASED ON THE SM-FE-N SYSTEM OF ELEMENTS

[75] Inventors: Kurt Schnitzke, Neunkirchen am Brand; Ludwig Schultz, Bubenreuth; Matthias Katter, Dechsendorf; Joachim Wecker, Erlangen, all of Fed. Rep. of Germany

[73] Assignee: Siemens Aktiengesellschaft, München, Fed. Rep. of Germany

[21] Appl. No.: 939,541

[22] Filed: Sep. 2, 1992

Related U.S. Application Data

[63] Continuation of Ser. No. 736,048, Jul. 25, 1991, abandoned.

[30] Foreign Application Priority Data

Jul. 25, 1990 [DE] Fed. Rep. of Germany ....... 4023575

[51] Int. Cl.$^5$ ............................................. H01F 1/02
[52] U.S. Cl. .................... 148/101; 148/104; 419/13
[58] Field of Search ............ 148/101, 104, 103; 419/13, 29, 53

[56] References Cited

U.S. PATENT DOCUMENTS

| 4,496,395 | 1/1985 | Croat | 148/301 |
| 4,743,311 | 5/1988 | Schultz et al. | 148/103 |

FOREIGN PATENT DOCUMENTS

| 0134304 | 3/1985 | European Pat. Off. |
| 0213410 | 3/1987 | European Pat. Off. |
| 0453270 | 10/1991 | European Pat. Off. |
| 60-131949 | 7/1985 | Japan |

OTHER PUBLICATIONS

IEEE Trans. On Mag., vol. Mag-23, No. 5, Sep. 1987, pp. 3098–3100, S. Higano et al.

Applied Physics Letters, 57(26), Dec. 24, 1990, pp. 2853–2855, K. Schnitzke et al.

Science and Technology of Nanostructured Magnetic Materials, Plenum Press, 1991, Ed. G. C. Hadjipanayis, pp. 439–457.

J. Appl. Phys., 64(10), Nov. 15 1988, pp. 5720–5721, "Magnetic Properties and Synthesis of High iHc Sm-Ti-Fe", N. Kamprath et al.

Nato Advanced Study Institute ... Jun. 25–Jul. 7, 1990, "Improved Magnetic Properties by Treatment of Iron Based Rare Earth Intermetallic Compounds in Ammonia", J. M. D. Coey et al.

Primary Examiner—John P. Sheehan
Attorney, Agent, or Firm—Kenyon & Kenyon

[57] ABSTRACT

Magnetic material of the Sm-Fe-N system exhibits a crystalline hard magnetic phase with a $Th_2Zn_{17}$ crystalline structure wherein N atoms are incorporated in the crystalline lattice. A preliminary product having a dual component $Sm_2Fe_{17}$ phase is produced by mechanical alloying followed by thermal treatment to achieve the desired microstructure. The preliminary product is heated in a nitrous atmosphere, as a result of which, the hard magnetic phase is formed. The preliminary product may also be obtained by a rapid-quenching technique.

22 Claims, 4 Drawing Sheets

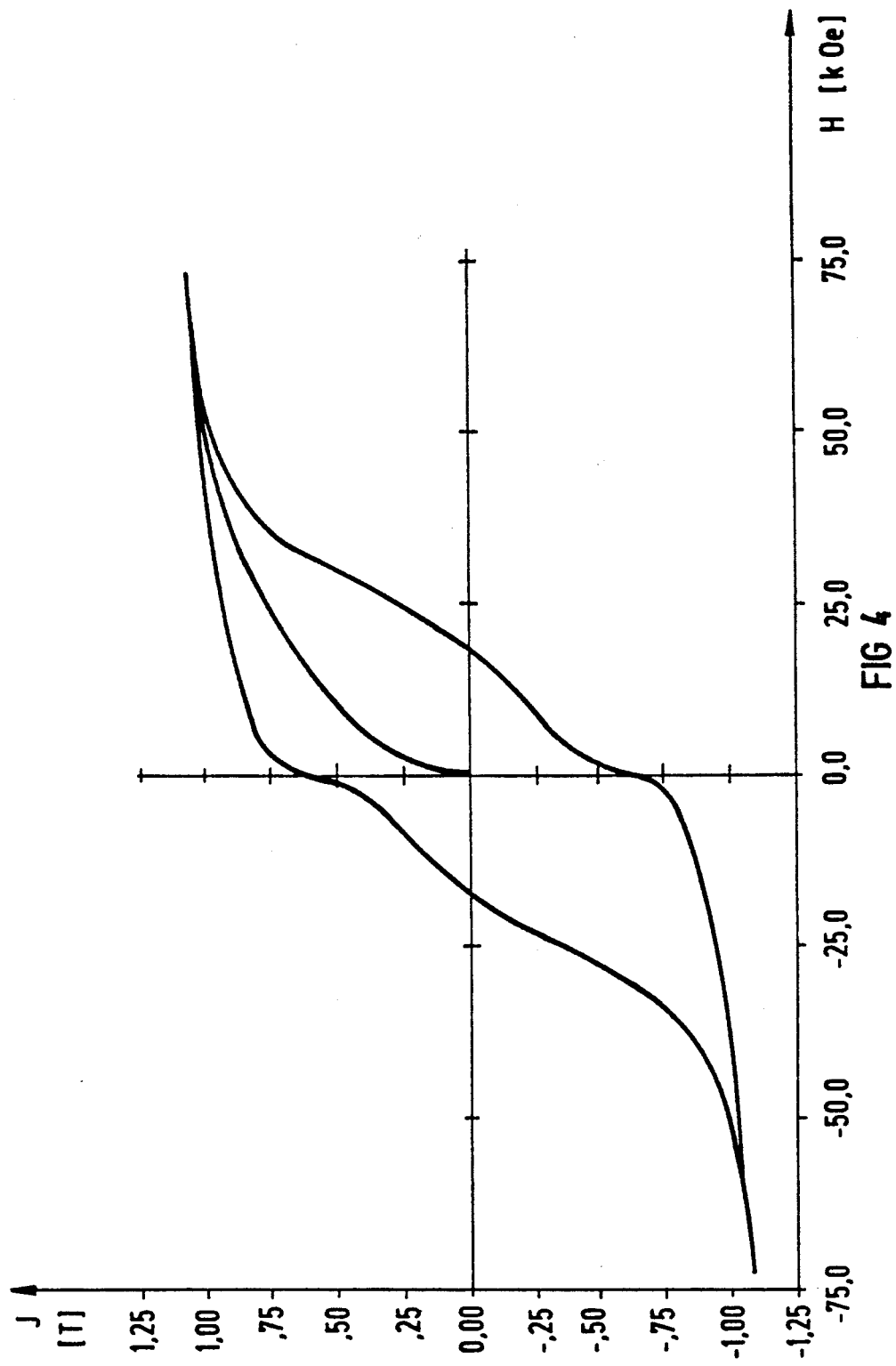

PROCESS FOR THE PRODUCTION OF MAGNETIC MATERIAL BASED ON THE SM-FE-N SYSTEM OF ELEMENTS

This application is a continuation, of application Ser. No. 07/736,048 filed Jul. 25, 1991, now abandoned.

FIELD OF THE INVENTION

This invention relates to a process for the production of magnetic material based on a substance system comprising Sm-Fe-N having a crystalline, hard, magnetic phase with a $Th_2Zn_{17}$ crystalline structure. N atoms are incorporated into the crystalline lattice. A preliminary product of the magnetic material to be produced with a two-component $Sm_2Fe_{17}$ phase is heated in an atmosphere containing nitrogen.

BACKGROUND OF THE INVENTION

For several years, magnetic material based on systems of substances that contain a rare earth metal and a transitional metal and distinguishing themselves by virtue of high coercive strength of field, $H_{ci}$, and high energy products, $(B*H)_{max}$, have been known. A major representative of a binary system of substances includes Co-Sm, and a major representative of a ternary system of substances includes Nd-Fe-B. The hard magnetic properties of these materials are based on intermetallic compounds having a high magnetic anisotropy and a pronounced degree of structure in the materials at issue. The production of these magnetic materials can, for example, be achieved through the sintering of powders of the components of the corresponding system of material. See, for example, European Patent Application EP-A-0 134 304. In addition, it is also possible to produce the corresponding magnetic materials by means of a so-called rapid-quenching technique. See, for example, European Patent Application EP-A-0 284 832.

Among the corresponding ternary magnetic materials the system of substances comprising Sm-Fe-Ti is discussed in Journal of Applied Physics, Vol. 64, No. 10, 1988, pages 5720 to 5722. Recently, the existence of $Sm_2Fe_{17}N_x$ as a magnetic material has come to be known. This material possesses the well-known $Th_2Zn_{17}$ crystalline structure. In the production of this material, $Sm_2Fe_{17}$ is melted as the initial material. The preliminary product obtained in this way is then heated in an $N_2$ or $NH_3$ atmosphere. As a result of this, the desired hard magnetic phase is formed due to the incorporation of N-atoms into the latticework structure of the preliminary product. See speech presented by J. M. D. Coey during the conference of the Nato Advanced Study Institute on the Science and Technology of Nanostructured Magnetic Materials, Jun. 25 to Jul. 7, 1990, Heraklion, Crete, Greece.

OBJECTS AND SUMMARY OF THE INVENTION

It is an object of the present invention to extend this known process for the production of a hard magnetic material based on an Sm-Fe-N substance system in such a way that by relatively simple means, the formation of the desired hard magnetic phase can be assured, and also so that a material with a high coercive field strength, $H_{ci}$, most preferably 5 kA/cm, can be obtained.

This object is met by an initial process having the characteristics cited at the outset. According to one embodiment of the present invention, in the first instance, a preliminary product having the two-component $Sm_2Fe_{17}$ phase is produced as a result of the mechanical alloying of the corresponding initial powders and as a result of thermal treatment with a micro-structure that corresponds to the hard magnetic phase of the magnetic material. Then this preliminary product is transformed in an atmosphere that contains nitrogen into the hard magnetic phase of the Sm-Fe-N substance system.

The invention takes as its point of departure the fact that by virtue of the incorporation of the N-atoms within the known $Th_2Zn_{17}$ crystalline structure, a material can be recovered that possesses hard magnetic properties without altering the type of the latticework. By means of the mechanical alloying process, which is known per se, it is possible to form the preliminary product to good advantage such that it possesses the microstructure of the ultimate product that is to be produced. This preliminary product, which is structured in such a way, can then be nitrated at an elevated temperature in a manner that is relatively simple and reproducible.

A process, in accordance with another embodiment of the present invention, for the production of the magnetic material is characterized by the fact that first a preliminary product with the dual-component $Sm_2Fe_{17}$ phase is produced as a result of the rapid-quenching of a melted preliminary alloy having the composition $Sm_xFe_{100-x}$ with $10 \leq x \leq 20$ (in each case in atomic %) having a micro-structure in keeping with the hard magnetic phase of the magnetic material. This preliminary product is transformed into the hard magnetic phase of the Sm-Fe-N substance system in an atmosphere that contains nitrogen. In the case of the embodiment of this process, the aforementioned advantages can also be obtained.

BRIEF DESCRIPTION OF THE DRAWINGS

FIGS. 3 and 4 show x-ray diffractograms and the hysteresis loop for a magnetic material produced by a rapid-quenching technique in accordance with the present invention.

DETAILED DESCRIPTION

Figure 1:
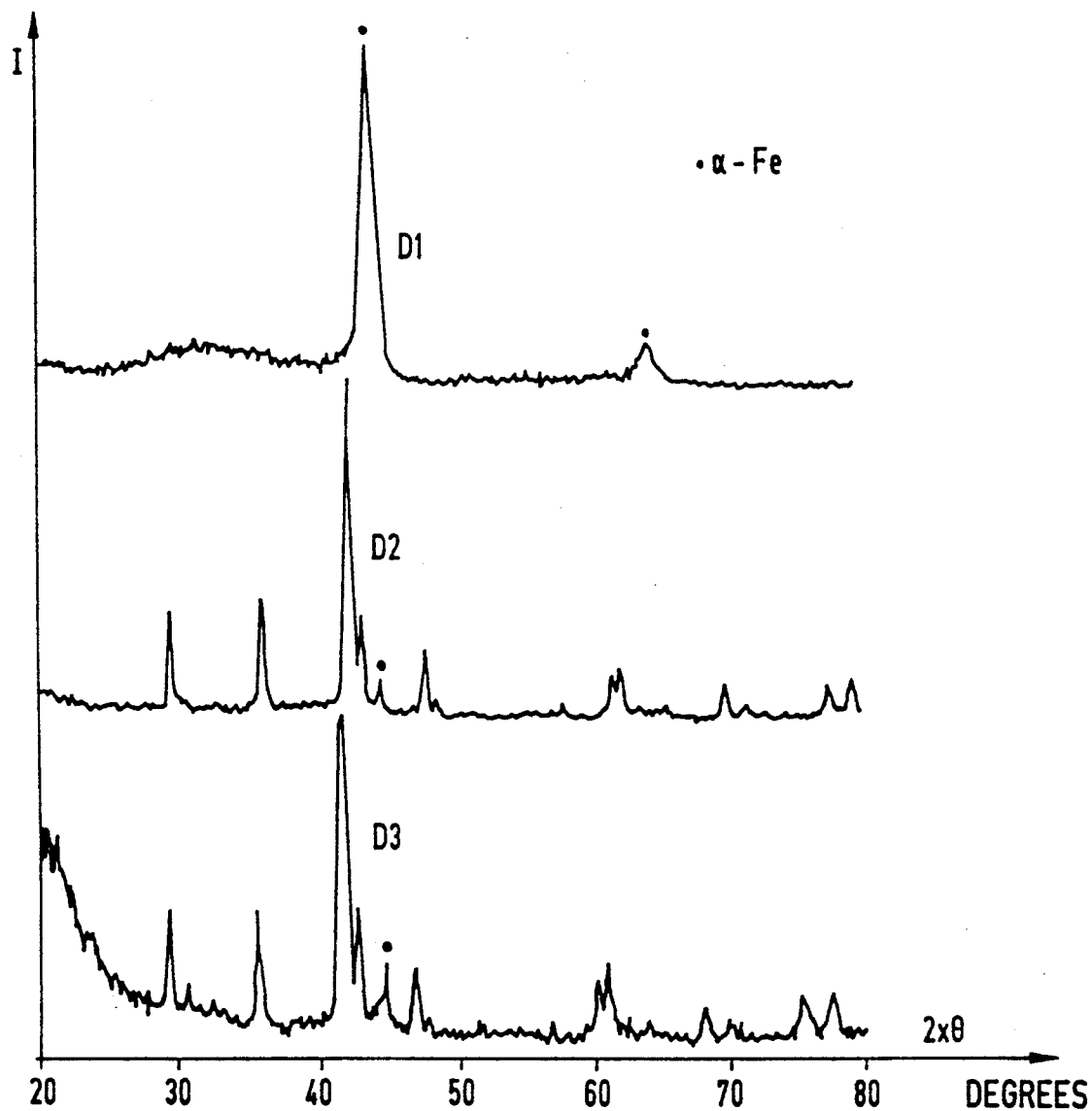
FIGS. 1 and 2 are x-ray diffractograms and a magnetization curve of a magnetic material obtained by way of the process of mechanical alloying in accordance with the present invention.

The magnetic material with the requisite hard magnetic properties can be developed to good advantage in accordance with the processes outlined below as Process A and Process B, all in accordance with the present invention.

Process A

In order to achieve the hard magnetic material of the Sm-Fe-N substance system, first a preliminary product with an $Sm_2Fe_{17}$ phase is produced using a grinding process. To this end, powders made of, or including the components involved, are taken as a point of departure. Either elemental powders are used, or the required elements may be present in the form of alloys and/or compounds. The initial components, which are in the form of powders with predetermined generally common particle sizes, are placed into a suitable grinding device, such as those known in principle from the processes of mechanical alloy-production. See, for example, "Metallurgical Transactions", Vol. 5, Aug. 1974, pages 1929 to 1934. The quantitative ratio of the individual components is set by the predetermined resultant atomic concentration of the preliminary product to be produced. Thus, provision must be made for weighing (in atomic %) that corresponds to the alloy $Sm_{12.5}Fe_{87.5}$. Particularly the elemental powders of the components at issue are then subjected to the grinding process with the aid of hardened steel balls in a steel container that is filled with Ar, for example. The duration of the grinding process, $t_m$, depends, in particular, upon the grinding parameters. Important parameters include the diameter of the balls, the number of balls, and the materials used in the mixing device. The rate of grinding and the ratio of steel balls to the amount of power are additional parameters hat determine the requisite duration of grinding. In generation, the requisite duration of grinding, $t_m$, falls between 1 and 100 hours. A grinding time of two to three days is advantageous. It is also possible to perform the grinding process at an elevated temperature.

At the end of the grinding process, bi-phasic ground stock (ground product) consisting of Sm-Fe- and finely-dispersed α-Fe is present. In some instances the Sm-Fe phase may be present in at least partially crystallized form. In this ground stock, the Sm-Fe phase may be crystalline, in part, at least. In this ground stock, the desired $Th_2Zn_{17}$ crystalline structure must still be adjusted with a predetermined optimized granule size with regard to the magnetic material that is to be produced. The granule size (size of the crystallite or the granules) should be between 30 nm and 500 nm. To this end, a thermal treatment under inert gas or in a vacuum at a temperature between 500° and 1000° C., preferably between 65° C. and 800° C., is conducted. The duration of this thermal treatment is suitably between 1 minute and 10 hours, preferably between 10 minutes and 1 hour. This thermal treatment leads, on the one hand, to the crystallization of the $Th_2Zn_{17}$ phase, and on the other hand, to the adjustment of the very fine microstructure, which is indispensable to magnetic hardening in this material. At the end of the thermal treatment, a corresponding preliminary product with the soft magnetic $Sm_2Fe_{17}$ is present.

In a further step, the preliminary product, in the form of a powder that was obtained in this manner, with the $Sm_2Fe_{17}$ phase, is annealed in an atmosphere of nitrogen ($N_2$). The temperature to be selected for this purpose should exceed 300° C., but be below 600° C. In general, provision should be made for this thermal treatment to take between 1 and 1000 hours, preferably between 10 and 300 hours to good effect. The incorporation of nitrogen atoms into the crystalline latticework occurs in conjunction with this treatment. In this way, a compound, $Sm_2Fe_{17}N_x$ occurs. In the process, it was determined that this compound exists for concentrations of nitrogen, x, for which $0 < x \leq 3$.

Furthermore, from the standpoint of process technology, it is noteworthy that the thermal stability of the compound $Sm_2Fe_{17} N_x$ definitely declines with a decline in the N-content. This means that in the case that nitration takes place too quickly at 500° C., for example, the $Th_2Zn_{17}$ phase can, under certain circumstances, dissociate. Thus, for example, the dissociation temperature for x=0.4 lies in the vicinity of 100° C., lower than for x=2.94. For this reason, values for x that are as high as possible (in the vicinity of x=3) are to be regarded as advantageous. The following table, Table 1, shows the definite dependency of the dissociation temperature, $T_d$ [in °C.], upon the concentration of nitrogen x [in atoms per unit cell]. The measurements indicated are approximate values, above which dissociation occurs (onset values).

TABLE 1

| x [N-atoms per unit cell] | 0.5 | 1 | 1.5 | 2 | 2.5 |
|---|---|---|---|---|---|
| $T_d$ [°C.] | 602 | 627 | 645 | 659 | 675 |

Due to this dependency of the thermal stability of the $Sm_2Fe_{17}N_x$ compound upon the concentration of nitrogen, it is particularly advantageous if the nitration process of the preliminary product, insofar as temperature conditions are concerned, is conducted in two stages, and in such a manner that for the first stage a particular temperature that is at least 50° C. lower than that for the second stage is selected. An exemplary embodiment of such a two-stage nitration process is set forth below.

1st Nitration Stage

Nitration occurs at a temperature, $t_{n1}$, between 300° C. and 400° C. for a time period, $T_{n1}$, ranging between 10 and 1000 hours. The time to be selected in concrete terms depends upon the granule size of the preliminary product powder to be nitrated. The N charge should at least reach a minimum concentration of x=1.5. Corresponding examples are based upon Table 2, which follows:

TABLE 2

| Granule size [μm] | 10 | 10 | 5 | 5 |
|---|---|---|---|---|
| $T_{n1}$ [°C.] | 400 | 350 | 400 | 350 |
| $t_{n1}$ [h] | 64 | 256 | 16 | 64 |

2nd Nitration Stage

An additional charge of nitrogen occurs, up to the maximal possible concentration of $x \leq 3$ at a temperature of $T_{n2}$, which is higher than temperature $T_{n1}$ of the first stage of nitration. For example, given a granule size of 10 um, a temperature $T_{n2}$ of 500° C. would be provided for over a period $t_{n2}$ of 16 hours.

In this two-stage nitration process, it is advantageous if the thermal stability of the $Sm_2Fe_{17}$ nitride is increased to such an extent that the hard magnetic phase cannot dissociate in the higher temperature, $T_{n2}$, which is required in the second nitration step to achieve complete nitration.

The nitration of the preliminary product occurs under expansion of the $Th_2Zn_{17}$ crystal structure without altering the type of lattice and without altering the microstructure. This state of affairs may be seen in the x-ray diffractograms (x-ray diffraction spectra), which are shown in the diagram of FIG. 1. In the diagram, the angle of refraction, 2 * Theta ($\theta$ in degrees) is entered on the abscissa, whereas in the direction of the ordinate, the appropriate intensity I (in arbitrary units of rate of count per second) is plotted. The curve shown in the upper portion of the diagram, which is designated D1, shows the diffractogram for the ground stock having the composition $Sm_{12.5} Fe_{87.5}$ after the mechanical alloying. The curve has the appearance typical of an amorphous state, and it also exhibits two expanded α-Fe reflexes. The crystalline structure of $Th_2Zn_{17}$ in the preliminary product that appears after a thermal treatment at 700° C., can be seen from the middle curve, which is designated D2. This diffractogram also contains remnants of α-Fe. By contrast, the lower diffractogram, which is labelled D3, results in the case of Th$_2$Zn$_{17}$ crystalline structure that was expanded by the incorporated N atoms at 500° C. From a comparison of the two curves, D2 and D3, it can be recognized without further ado that in the case of the magnetic material in keeping with the invention, the lattice type remains unchanged when it is compared with the preliminary product.

Figure 2:
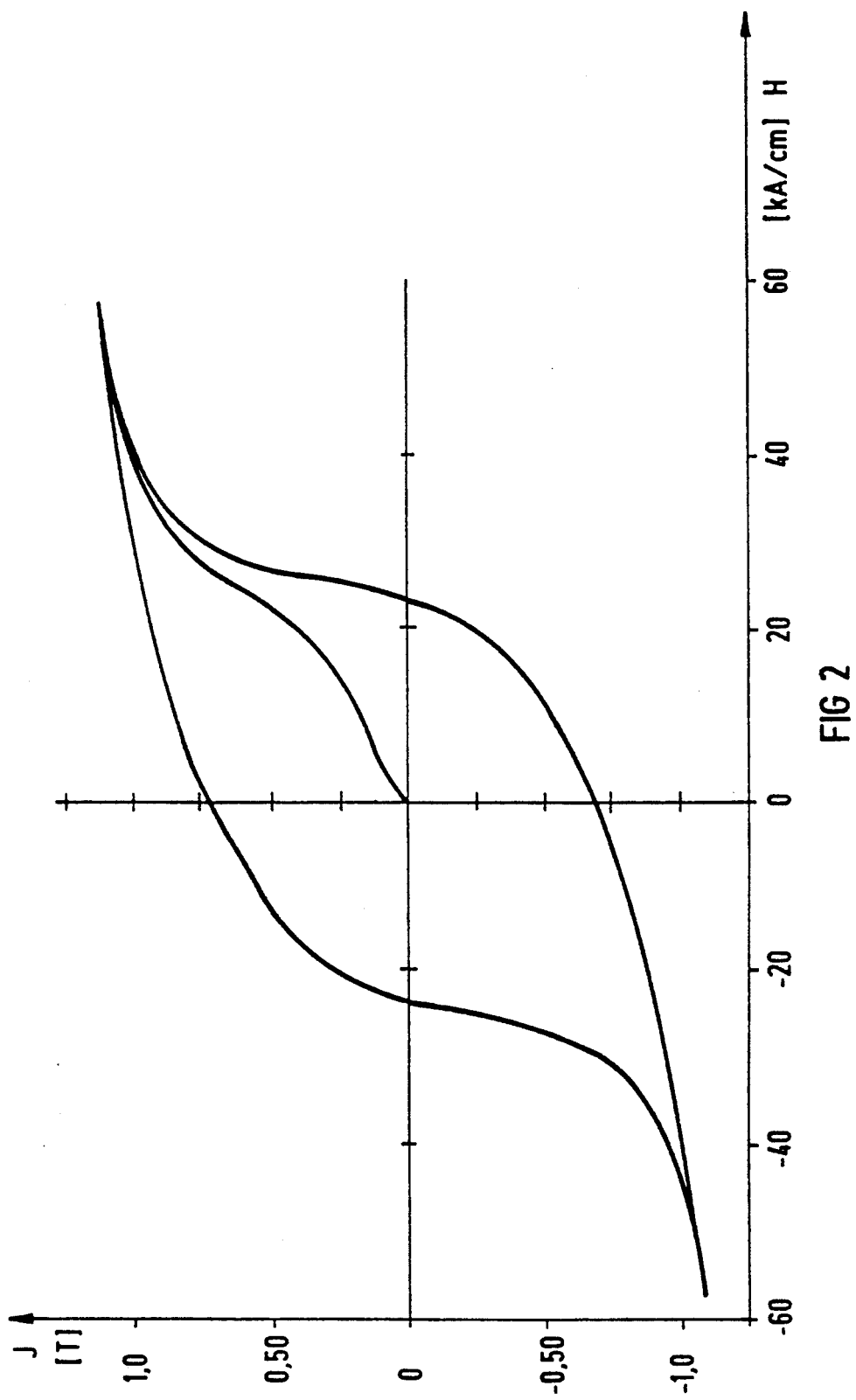

The hysteresis curve of the crystalline, hard magnetic finished product made of the Sm-Fe-N system of substances is depicted in FIG. 2 as the curve marked m. In the direction of the abscissa, the strength of field H (in kA/cm), and in the direction of the ordinate, the magnetization J (in T) are plotted on this diagram. The hysteresis curve m shows a residual magnetism (remanence) J$_r$ of about 0.71 T, as well as a coercive strength of field, H$_{ci}$, of about 23.5 kA/cm.

The curves shown in the diagrams of FIGS. 1 and 2 are then obtained if provision is made for an annealing period of ½ an hour for the individual annealing treatments.

With such annealing times, magnetic materials were produced according to Process A, the data for which at 20° C. are compiled in the following Table 3. The materials were nitrated at 500° C.

TABLE 3

| Material (weighed in in atomic %) | Coercive Strength of field H$_{ci}$ (kA/cm) | Residual Magnetism J$_r$ (T) | Density of energy (B × H)$_{max}$ (kJ/m$^3$) |
|---|---|---|---|
| Sm$_{10.5}$Fe$_{89.5}$ + N | 15.3 | 0.82 | 55 |
| Sm$_{11.5}$Fe$_{88.5}$ + N | 17.7 | 0.79 | 68 |
| Sm$_{12.5}$Fe$_{87.5}$ + N | 23.6 | 0.71 | 87 |
| Sm$_{13.5}$Fe$_{86.5}$ + N | 24.0 | 0.69 | 73 |

The increase in the coercive strength of field H$_{ci}$ and the decrease in residual magnetism J$_r$ as the proportion of The increase in the coercive strength of field H$_{ci}$ and the decrease in residual magnetism J$_r$ as the proportion of Sm increases, while the density of energy, B×H, passes through its peak, are items that may be observed from the table.

Process B

As a deviation from Process A, the magnetic material in accordance with the present invention can just as readily be obtained from a preliminary product that was produced by means of a rapid-quenching technique. To do so, first the initial components of the preliminary product must be melted in an Ar atmosphere under conditions of sufficient purity. The proportions of the individual components are selected in such a manner that the preliminary alloy exhibits the composition Sm$_x$Fe$_{100-x}$, wherein x lies between 10 and 20 (in atomic % in each case). For melting, pyrolithic BN- or Al$_2$O$_3$ crucibles may be used. In particular, melting in an arc furnace is also possible. The preliminary alloy obtained in this manner can then, by means of a rapid-quenching technique that is known per se, be transformed into a fine crystalline preliminary product. To this end, provision may be made to use the so-called "melt spinning" process to good advantage, a process that is generally known for producing amorphous metallic alloys. See, for example, "Zeitschrift fur Metallkunde", Journal of Metallurgy, Vol. 69, No. 4, 1978, pages 212 to 220. According to this method, under an inert gas, such as Ar, for example, or in a vacuum, the preliminary alloy is melted in a quartz or BN crucible having high frequency at a temperature between 1300° C. and 1500° C., preferably between 1350° C. and 1450° C., and then sprayed through a quartz nozzle having a jet diameter of 0.5 mm, for example, and a pressure of 0.25 bar, for example, onto a rotating substrate, such as a copper wheel or a copper roller. In this process, the wheel should turn at such a rate that at its perimeter a substrate velocity, v$_s$, between 5 m/s and 60 m/s, preferably between 10 m/s and 25 m/s is achieved. In this way, short, strip-like pieces of preliminary product are obtained that are relatively brittle and exhibit as their main phase Sm$_{12}$Fe$_{17}$ with the Th$_2$Zn$_{17}$ crystalline structure. In order to set an optimal micro-structure of the preliminary product, a choice of suitable quenching parameters must be established. Thus, for example, quenching from a melt with a temperature of 1400° C. with substrate velocities, v$_s$, between 15 m/s and 20 m/s is particularly favorable. In addition, it is also possible to provide for a thermal post-treatment, especially for very rapidly quenched strips (with v$_s$ > 50 m/s) at temperatures between 500° C. and 1000° C., preferably between 650° C. and 800° C. The duration of annealing is generally between 1 minute and 10 hours, preferably between 10 minutes and 1 hour. Given such a thermal post-treatment, the soft magnetic SmFe$_2$ phase of the preliminary product is transformed into the magnetically harder SmFe$_3$ phase of an intermediate product.

The preliminary or intermediate product to be obtained in this manner in Process B is rendered smaller by mechanical means to good effect prior to the concluding thermal treatment in an atmosphere containing nitrogen. It is preferably ground as fine as possible, so as to achieve a reduction in the requisite nitration time in this way. In particular, the preliminary or intermediate product can be pulverized or crushed in a mortar to granule sizes below 40 μm. Following that, it is subjected to magnetic tempering through annealing at temperatures between 300° C. and 600° C. in keeping with Process A, creating the desired Sm$_2$Fe$_{17}$N$_x$ phase in the process.

Figure 3:
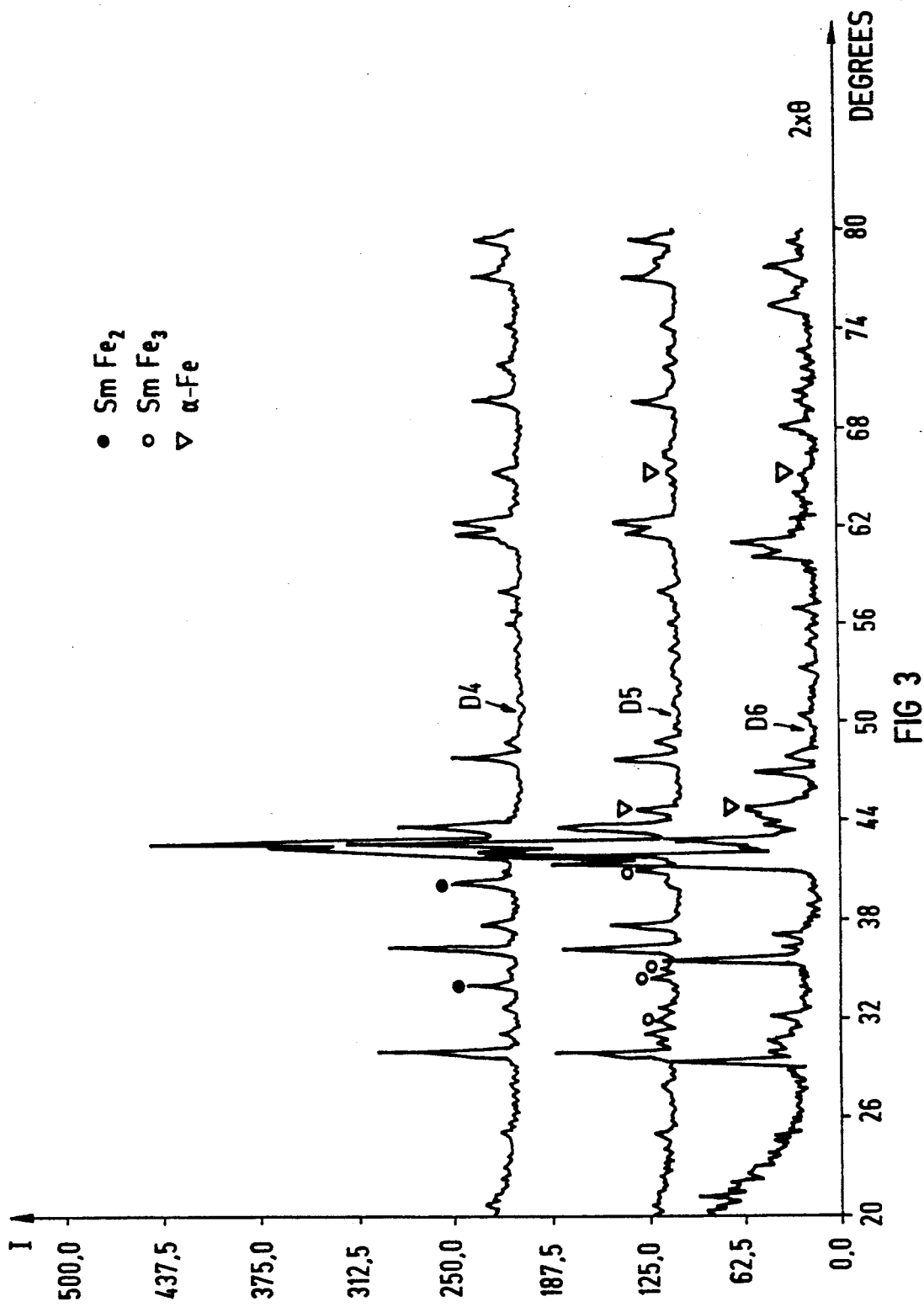

The successive formation of the hard magnetic Sm$_2$Fe$_{17}$N$_x$ phase by means of the various thermal treatments can be read from the diagram in FIG. 3. In this diagram, in keeping with FIG. 1, three x-ray diffractograms of rapidly quenched Sm$_{15}$Fe$_{85}$ are illustrated. These are:

a) after the quenching from T=1400° C. at v$_s$=20 m/s (Curve D4);

b) after additional annealing for 4 hours at 800° C. in Ar (Curve D5); and c) after subsequent annealing for 16 hours duration at 400° C. in an N2 atmosphere (Curve D6).

In the diagram, peaks that are to be ascribed to the SmFe$_2$ phase and the SmFe$_3$ phase, as well as the α-Fe-reflexes, are specially marked.

FIG. 4 illustrates an additional hysteresis curve which results from a magnetic material of the composition of Sm$_{13}$Fe$_{87}$N$_x$. This material was produced in keeping with the material that yields Curve D6 in FIG. 3. A mode of presentation that reflects FIG. 2 is chosen for FIG. 4. A maximal coercive strength of field H$_{ci}$ of about 17.9 kOe, a residual magnetism, J$_r$, of 0.63 T, and an energy density, (B×H)$_{max}$ of 44 kJ/m$^3$ can be read from the curve illustrated in FIG. 4.

Although preferred embodiments of the present invention have been described in detail, it will be appreciated that variations may be made by one skilled in the art, all within the spirit and the scope of the present invention.

What is claimed is:

1. In a process for the production of a magnetic material based on a composition consisting essentially of Sm-Fe-N and having a crystalline, hard magnetic phase with a $Th_2Zn_{17}$ crystalline structure, wherein nitrogen atoms are incorporated in the crystalline lattices, said process including the steps of providing a preliminary product having a binary $Sm_2Fe_{17}$ phase and of subsequently heating the preliminary product in a nitrogen atmosphere, the improvement comprising:

providing said preliminary product having said binary $Sm_2Fe_{17}$ phase by mechanical alloying of powders containing ; Sm and Fe and by thermal treatment, whereby a very fine crystalline structure is obtained in the preliminary product, and transforming said preliminary product into said Sm-Fe-N composition with said hard magnetic phase by said heating of said preliminary product in said nitrogen atmosphere, without altering said very fine microstructure.

2. A process according to claim 1 wherein said mechanical alloying produces a ground product of at least partially amorphous Sm-Fe and α-Fe followed by thermally treating said ground product to provide said preliminary product with said crystalline microstructure.

3. A process according to claim 1 wherein said thermal treatment for producing said preliminary product is at a temperature between 500° C. and 1000° C.

4. A process according to claim 3 wherein said temperature is between 650° C. and 800° C.

5. A process according to claim 3 wherein said thermal treatment for producing said preliminary product occurs for a time period ranging between 1 minute and 10 hours.

6. A process according to claim 5 wherein said time period ranges between 10 minutes and 1 hour.

7. In a process for the production of a magnetic material based on a composition consisting essentially of Sm-Fe-N and having a crystalline, hard magnetic phase with a $Th_2Zn_{17}$ crystalline structure, wherein nitrogen atoms are incorporated into the crystalline lattices, said process including the steps of providing a preliminary product having a binary $Sm_2Zn_{17}$ phase and of subsequently heating said preliminary product in a nitrogen atmosphere, the improvement comprising:

providing said preliminary product having said binary $Sm_2Fe_{17}$ phase by rapid-quenching a molten preliminary alloy having a composition $Sm_xFe_{100-x}$ where $10 \leq X \leq 20$ in atomic %, whereby a very fine crystalline microstructure is obtained in the preliminary product, and transforming said preliminary product into said Sm-Fe-N composition with said hard magnetic phase by said heating of said preliminary product in said nitrogen atmosphere, without altering said very fine microstructure.

8. A process according to claim 7 wherein said molten preliminary alloy is melted at 1300° C. to 1500° C and said rapid-quenching is provided by quenching said molten preliminary alloy by a melt spinning process comprising ejecting said molten preliminary alloy onto a rotating substrate having a circumference having a velocity at the circumference ranging from 5 m/sec to 60 m/sec.

9. A process according to claim 8 wherein said molten preliminary alloy is melted at 1350° C. to 1450° C.

10. A process according to claim 8 wherein said rotating substrate has a velocity at the circumference ranging from 10 m/sec to 25 m/sec.

11. A process according to claim 7 further comprising reducing said preliminary product in size by mechanical means prior to said heating in said nitrogen atmosphere.

12. A process according to claim 11 where said preliminary product is reduced to granule sizes of below 40 μm.

13. A process according to claim 7 further comprising thermally treating said preliminary product having said binary $Sm_2Fe_{17}$ phase at a temperature between 500° C. and 1000° C. under an inert gas or a vacuum, prior to said heating in a nitrogen atmosphere.

14. A process according to claim 13 wherein said thermal treating temperature is between 650° C. and 800° C.

15. A process according to claim 1 wherein said heating of said preliminary product in a nitrogen atmosphere to form said hard magnetic phase takes place at a temperature of from 300° C. to 600° C. for a period of 1 hour to 1000 hours.

16. A process according to claim 7 wherein said heating of said preliminary product in a nitrogen atmosphere to form said hard magnetic phase takes place at a temperature of from 300° C. to 600° C. for a period of 1 hour to 1000 hours.

17. A process according to claim 15 wherein said heating of said preliminary product in a nitrogen atmosphere to form said hard magnetic phase is a two stage process wherein heating temperature in a first stage is lower than heating temperature in a subsequent second stage.

18. A process according to claim 16 wherein said heating of said preliminary product in a nitrogen atmosphere to form said hard magnetic phase is a two stage process wherein heating temperature in a first stage is lower than heating temperature in a subsequent second stage.

19. A process according to claim 17 wherein the heating temperature of the first stage is from 300° C. to 400° C.

20. A process according to claim 18 wherein the heating temperature of the first stage is from 300° C. to 400° C.

21. A process according to claim 17 wherein said heating to form said hard magnetic phase occurs for a total time period ranging between 1 and 1000 hours.

22. A process according to claim 18 wherein said heating to form said hard magnetic phase occurs for a total time period ranging between 1 and 1000 hours.

* * * * *